Figure 1:
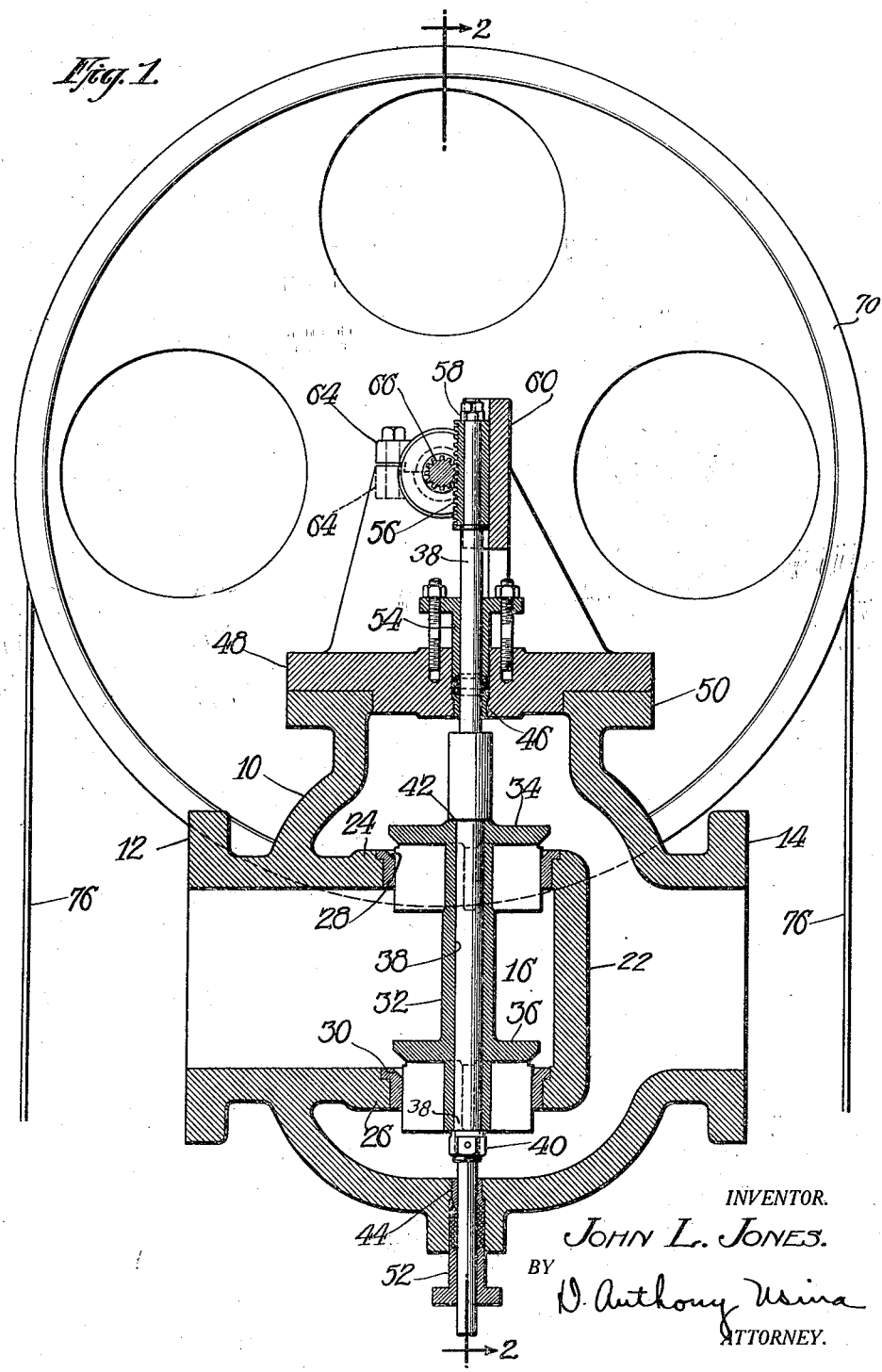

July 8, 1924.

J. L. JONES

VALVE

Filed June 2, 1922

1,500,820

2 Sheets-Sheet 1

INVENTOR.
JOHN L. JONES.
BY
D. Anthony Usina
ATTORNEY.

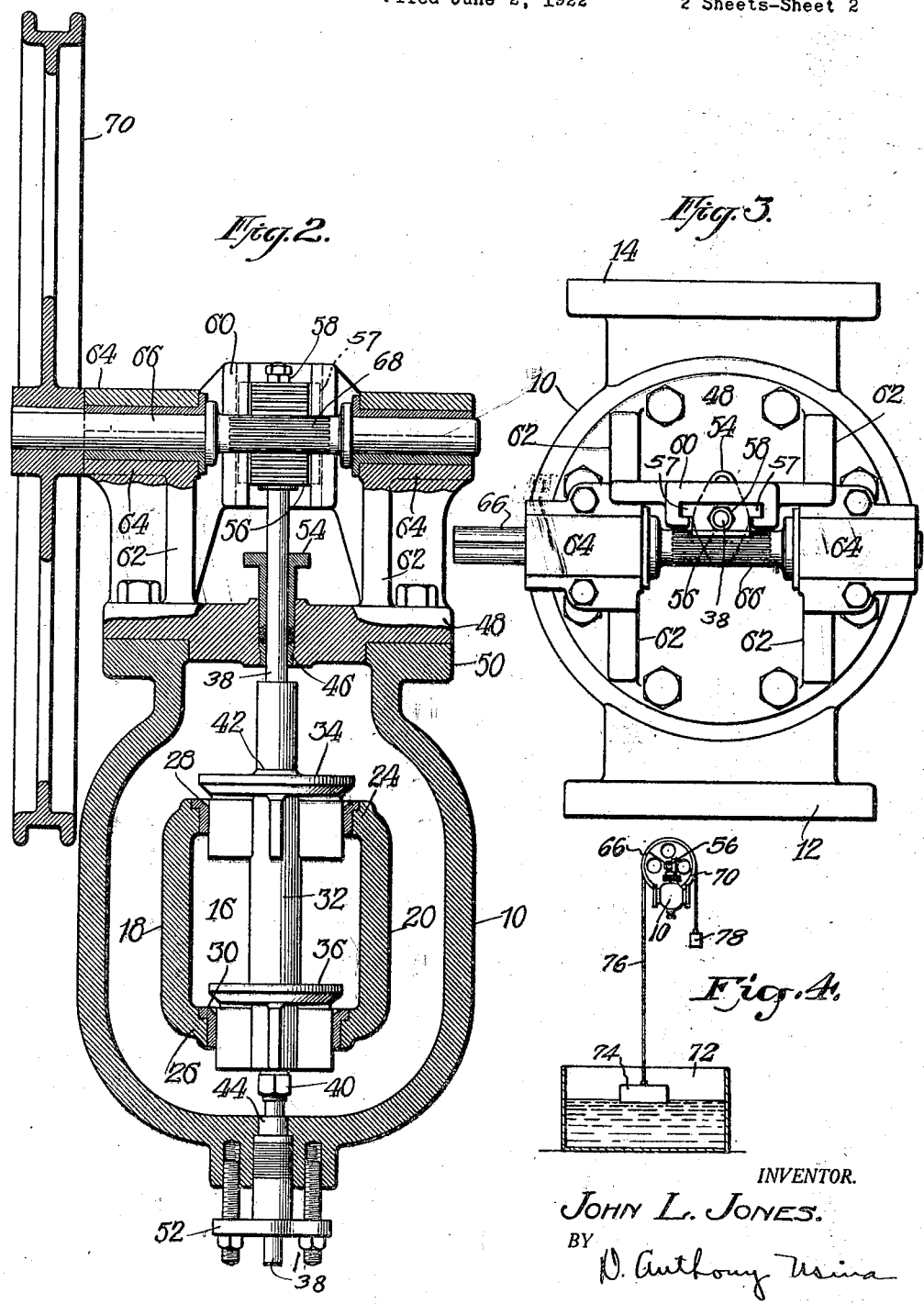

Patented July 8, 1924.

1,500,820

UNITED STATES PATENT OFFICE.

JOHN L. JONES, OF BIRMINGHAM, ALABAMA.

VALVE.

Application filed June 2, 1922. Serial No. 565,364.

*To all whom it may concern:*

Be it known that I, JOHN L. JONES, a citizen of the United States, residing at Birmingham, Jefferson County, and State of Alabama, have invented certain new and useful Improvements in Valves, of which the following is a specification.

My invention relates to automatically actuated valves and particularly to improved means for guiding the stems thereof so that they move steadily and smoothly so as to prevent water hammer or jerky movements of the valve. Valves of this class heretofore used have been the source of much trouble due to leakage caused by improper seating of the valves caused by the seats and valves being cut or unevenly worn by snapping shut.

One object of my invention is to provide a valve structure which will eliminate water hammer and thus prevent rapid or uneven wear on the valves or valve seats. Another object is to provide means for guiding the valve carrying stem at opposite ends to insure a smooth even movement thereof. A further object is to provide means for actuating the valve stems which are so guided that no strain is imposed on the stem. A still further object is to organize and combine the various elements herein shown and described so that they individually and jointly perform the functions set forth.

An embodiment of my invention is illustrated in the accompanying drawings in which—

Fig. 1 is a vertical section of the valve;
Fig. 2 is a section on line 2—2 of Fig. 1;
Fig. 3 is a top plan of the valve.
Fig. 4 is a small scale view showing the approximate relative proportions of the parts.

Referring to the drawings the valve consists of a body 10 on which is formed suitable flanges 12 and 14 for the supply and exhaust pipes. Connected to the supply opening is a chamber 16 formed by side walls 18 and 20, an end wall 22 and top and bottom walls 24 and 26. Bushings 28 and 30 made of proper material are fitted in the walls 24 and 26 in axial alignment with each other and form seats for a double valve 32 having heads 34 and 36 adapted to coact with seats 28 and 30. The double valve is rigidly secured to a valve stem 38 by a nut 40 jamming it against a shoulder 42. The stem is accurately guided on both sides of the valves by bushings 44 and 46 placed in the body 10 and in the valve body head 48 which is secured to a flange 50 of the valve body. Adjacent these bushings are placed packing and packing glands 52 and 54 to prevent leakage. At the top of the stem is mounted a rack 56 which is rigidly fastened by a nut 58 forcing the rack against a shoulder on said stem.

Formed on the head 48 is a guide 60 and the rack 56 is provided with tongues 57 which slide in this guide thus eliminating any strain in the valve stem.

The valve body head is also provided with standards 62 which carry bearings 64 with suitable bushings which support a pinion shaft 66 in correct alignment with the rack 56. The pinion teeth 68 are cut in the shaft as shown and on one end of the pinion shaft is keyed or otherwise secured a drum wheel 70.

The exhaust end 14 of the valve is connected by a pipe not shown to a tank 72 in which is located a float 74 to which is attached a rope 76. The rope is wrapped one or more times around the drum wheel 70 and secured to a counterweight 78. The counterweight is heavy enough to take slack out of the rope, but is not capable of lifting the float. As the liquid in the tank lowers the float pulls the rope which in turn revolves the drum wheel and pinion. The pinion being engaged in the rack lifts the stem and the valve carried thereby thus allowing any liquid from the supply line to pass the two separate valve seats 28 and 30 opening into the exhaust line. As the tank fills, the float rises allowing the counterweight to revolve the pinion in an opposite direction thus closing the valve.

In practice it has been found that balanced valves heretofore used have produced excessive water hammer which causes the seats to rapidly cut and leak.

By guiding the valve stem at each end a smooth steady movement of the valve is secured and by guiding the operating rack independently, the valve stem is relieved of pressure exerted by the pinion thereby preventing excessive wear on the stem or its guide bushings.

In actual use it has been determined that valves heretofore constructed have produced excessive water hammer and caused a leakage at the rate of over a million gallons per day in one plant, and that said valves required repairing at intervals of from two to four weeks.

My improved valve has been installed to take the place of the valves above referred to and there has been practically no leakage nor loss of time to repair the valve.

The parts are of simple construction and can be readily assembled, and by disconnecting the head 48 the operating parts can all be removed as a single unit and access can be had to the seats for re-grinding or replacement.

Though I have described with great particularity the details of the embodiment of the invention herein shown it is not to be construed that I am limited thereto as changes in arrangement and substitution of equivalents may be made by those skilled in the art without departing from the invention as defined in the subjoined claims.

What I claim is:

1. An automatic regulating float valve including a valve body having a valve seat therein, a valve adapted to engage said seat, a stem for supporting said valve and means on opposite sides of said valve for guiding said stem, a rack secured to said valve stem, a drum wheel and pinion operatively connected with said rack and a float and counterweight connected to said drum for controlling the movements of said valve stem.

2. A valve comprising a body having a pair of axially aligned valve seats therein, a valve stem carrying valves adapted to co-act with said seats, guides for the opposite ends of said valve stem, a rack secured to said stem, guiding means for said rack carried by the valve body, a pinion for moving said rack and a float and counterweight for controlling the movement of said rack.

In witness whereof, I have hereunto signed my name.

JOHN L. JONES.